United States Patent
Wu (10) Patent No.: US 11,687,354 B2
(45) Date of Patent: Jun. 27, 2023

(54) VIRTUAL MACHINE MANAGEMENT USING ONBOARDING OPERATIONS AND OPENSTACK CONTROL

(71) Applicant: NEW H3C CLOUD TECHNOLOGIES CO., LTD., Chengdu (CN)

(72) Inventor: Yongpeng Wu, Beijing (CN)

(73) Assignee: NEW H3C CLOUD TECHNOLOGIES. LTD., Chengdu (CN)

(*) Notice: Subject to any disclaimer, the term of this patent is extended or adjusted under 35 U.S.C. 154(b) by 309 days.

(21) Appl. No.: 16/618,979

(22) PCT Filed: Jun. 27, 2018

(86) PCT No.: PCT/CN2018/093161
§ 371 (c)(1),
(2) Date: Dec. 3, 2019

(87) PCT Pub. No.: WO2019/001480
PCT Pub. Date: Jan. 3, 2019

(65) Prior Publication Data
US 2020/0174818 A1    Jun. 4, 2020

(30) Foreign Application Priority Data
Jun. 27, 2017 (CN) .......................... 201710503088.2

(51) Int. Cl.
*G06F 9/455* (2018.01)
*G06F 16/22* (2019.01)
(Continued)

(52) U.S. Cl.
CPC ...... *G06F 9/45558* (2013.01); *G06F 16/2282* (2019.01); *H04L 41/08* (2013.01);
(Continued)

(58) Field of Classification Search
CPC . G06F 2009/45562; G06F 2009/45575; G06F 3/0604; H04L 12/46; H04L 12/4641; H04L 41/0873
See application file for complete search history.

(56) References Cited

U.S. PATENT DOCUMENTS 11,249,788 B2* 2/2022 Ao ........................ G06F 9/45558
2011/0066841 A1 3/2011 Goodrow et al.
(Continued)

FOREIGN PATENT DOCUMENTS

CN  105338045  2/2016
CN  105577442  5/2016
(Continued)

OTHER PUBLICATIONS

Carapinha et al. "T-NOVA | Deliverable D3.1". Sep. 30, 2015. TNOVA. Seventh Framework Programme. Network Functions As-A-Service Over Virtualised Infrastructures. pp. 1-72. (Year: 2015).*
(Continued)

*Primary Examiner* — Qing Yuan Wu
(74) *Attorney, Agent, or Firm* — Norton Rose Fulbright US LLP (57) ABSTRACT

The present disclosure provides a virtual machine management method and apparatus. The method includes: acquiring virtual machine information of each virtual machine in a virtualization platform, receiving a first onboarding operation instruction for a target virtual machine in the virtualization platform, configuring a network and a virtual network console VNC of the target virtual machine, and when the configuration succeeds, storing in an already-onboarded virtual machine list in a database table virtual machine information of the target virtual machine. With the application of examples of the present disclosure, a unified man-
(Continued)

agement and control of virtual machines in the virtualization platform by a cloud management platform can be realized.

12 Claims, 2 Drawing Sheets

(51) Int. Cl.
| | |
|---|---|
| *H04L 67/1097* | (2022.01) |
| *H04L 41/08* | (2022.01) |
| *H04L 41/0895* | (2022.01) |
| *H04L 41/04* | (2022.01) |
| *H04L 41/0803* | (2022.01) |
| *H04L 41/0806* | (2022.01) |
| *H04L 67/10* | (2022.01) |
| *G06F 9/445* | (2018.01) |

(52) U.S. Cl.
CPC ...... *H04L 41/0895* (2022.05); *H04L 67/1097* (2013.01); *G06F 9/44505* (2013.01); *G06F 2009/45562* (2013.01); *G06F 2009/45595* (2013.01); *H04L 41/04* (2013.01); *H04L 41/0803* (2013.01); *H04L 41/0806* (2013.01); *H04L 67/10* (2013.01)

(56) References Cited

U.S. PATENT DOCUMENTS

| | | | | |
|---|---|---|---|---|
| 2013/0212576 | A1* | 8/2013 | Huang | G06F 9/45537 |
| | | | | 718/1 |
| 2016/0202916 | A1* | 7/2016 | Cui | G06F 3/065 |
| | | | | 711/162 |
| 2017/0171213 | A1 | 6/2017 | Beveridge et al. | |
| 2018/0048523 | A1* | 2/2018 | Nakano | G06F 8/60 |

FOREIGN PATENT DOCUMENTS

| | | | | |
|---|---|---|---|---|
| CN | 105589731 | | 5/2016 | |
| CN | 105635311 | | 6/2016 | |
| JP | WO2016125554 | A1 * | 8/2016 | ............... G06F 8/60 |
| WO | WO 2015/040788 | | 3/2015 | |
| WO | WO 2016/167086 | | 10/2016 | |

OTHER PUBLICATIONS

Office Action issued in Corresponding Japanese Application No. 2020-520707, dated Feb. 9, 2021 (English Translation provided).
International Search Report and Written Opinion Issued in PCT Application No. PCT/CN2018/093161, dated Sep. 30, 2018 (English Translation of Search Report Provided).
Notification to Grant Patent Right for Invention issued in Corresponding Chinese Application No. 201710503088.2, dated Aug. 31, 2020 (English translation provided).
Office Action issued in Corresponding Japanese Application No. 2020-520707, dated Aug. 17, 2021 (English Translation provided).
Taira et al., "Suggest multi user VM environment for OS class" *Information Processing Society of Japan* 2014, vol. 2014-ARC-210 No. 15, p. 1-6.
VMware, Inc, *Detailed Description of VMware NSX*. First Edition, Inpress Tsuchida Co., Ltd., 2014, p. 69.

* cited by examiner

VIRTUAL MACHINE MANAGEMENT USING ONBOARDING OPERATIONS AND OPENSTACK CONTROL

CROSS-REFERENCE TO RELATED APPLICATION APPLICATIONS

The present application is a national phase under 35 U.S.C. § 371 of International Application No. PCT/CN2018/093161, filed Jun. 27, 2018, which claims priority to Chinese patent application no. 201710503088.2, filed on Jun. 27, 2017 with the China National Intellectual Property Administration, entitled "Virtual Machine Management Method and Apparatus", each of which are incorporated herein by reference in their entirety.

BACKGROUND ART

Cloud computation is a mode in which the billing is based on actual usage amount, and provides usable, convenient, and on-demand network access. Basing on the cloud computation technology, a user only needs to put a little effort on management or interacts a little with a server provider, to be able to use resources in a shared computing resource pool, such as network, server, memory, application software and service.

With the maturity of cloud computation solutions, a user needs to build cloud platform services with cloud applications, and uses applications in addition to the virtualization function itself, such as user identity authentication service, storage service, and network service, thus a virtualization platform needs to be integrated into a cloud platform for management. Consequently, in the cloud platform, managing and controlling virtual machines originally in the virtualization platform are involved.

DETAILED DESCRIPTION OF EMBODIMENTS

In order to enable a person skilled in the art to better understand technical solutions in examples of the present disclosure, and to make the above objects, features and advantages of the examples of the present disclosure more apparent and understandable, the technical solutions in the examples of the present disclosure are further described below in detail in combination with the drawings.

Figure 1:
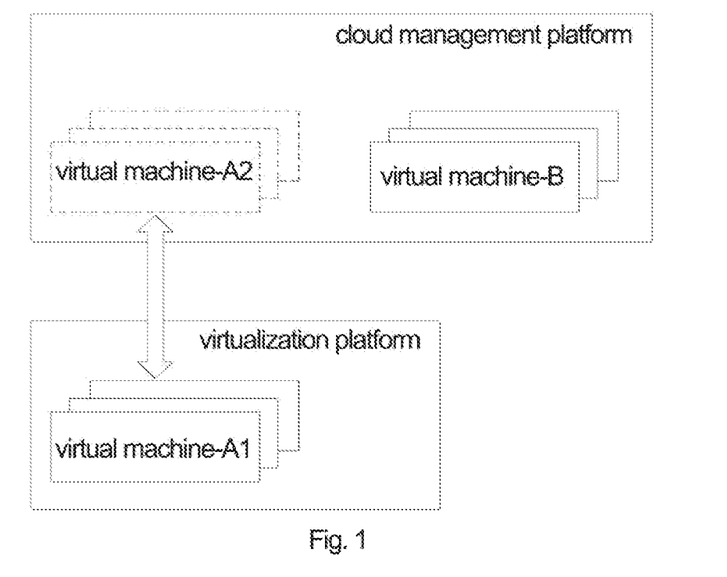
FIG. 1 is a schematic diagram of architectural relation between a cloud management platform and a virtualization platform provided in examples of the present disclosure.

Referring to FIG. 1, a virtualization platform is a platform providing virtual machine management to a user, and the user can create virtual machines on the virtualization platform, and manage various functions or configurations of these virtual machines. A cloud management platform is another type of virtual machine management platform created by cloud application, and besides a virtualization function, the cloud management platform can further realize other functions such as user identity authentication service, storage service, and network service.

In some scenarios, the virtualization platform may have been originally configured thereon with a certain number of virtual machines, but the virtual machines on the virtualization platform still need to be integrated to the cloud management platform for a unified management so as to realize more functions, at which time it is needed to onboard on the cloud management platform the virtual machines already configured on the virtualization platform. Therefore, examples of the present disclosure provides a solution of onboarding virtual machines already configured on a virtualization platform by a cloud management platform, and the solution provided in the present disclosure is described below in detail.

In examples of the present disclosure, a cloud management platform is provided. The cloud management platform can be implemented by an entity electronic device, for example, one server or a cluster consisting of a plurality of servers. The cloud management platform can also be implemented by functional modules or virtual devices configured on an entity electronic device for providing services.

Figure 2:
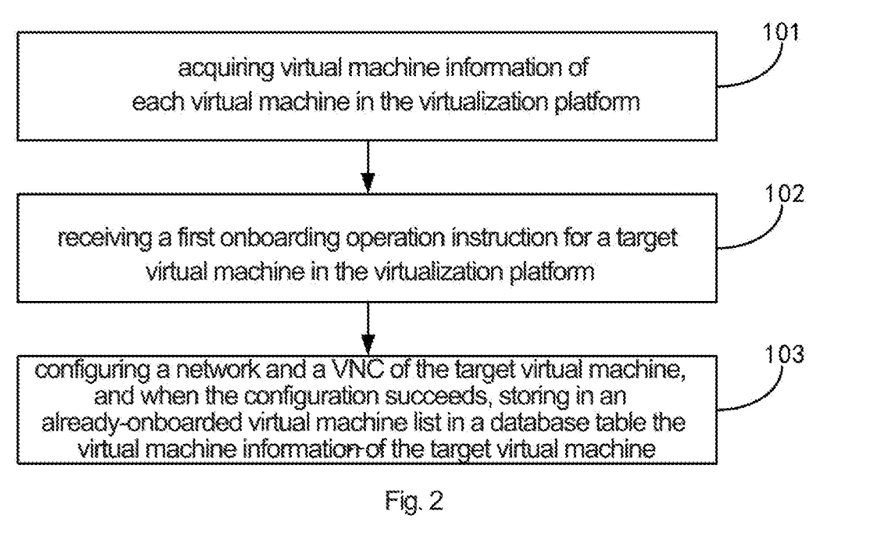
FIG. 2 is a schematic flow chart of a virtual machine management method provided in examples of the present disclosure.

Referring to FIG. 2, it is a schematic flow chart of a virtual machine management method provided in examples of the present disclosure, wherein the method can be applied to a cloud management platform, and as shown in FIG. 2, and the method can include the following steps:

It should be indicated that in examples of the present disclosure, the cloud management platform can include an onboarding operation module and an OpenStack (open protocol stack) control module, wherein the onboarding operation module is configured to provide a functional interface to the cloud management platform for interacting with a user (e.g. a cloud administrator), the user can send an onboarding operation instruction to the cloud management platform via this functional interface, such that the cloud management platform is enabled to onboard virtual machines in the virtualization platform (that is, the virtual machines in the virtualization platform are managed and controlled by the cloud management platform), after receiving the onboarding operation instruction via the onboarding operation module, the cloud management platform can send an onboarding request to the OpenStack control module, and a specific onboarding operation is executed by the OpenStack control module.

Step 101. acquiring virtual machine information of each virtual machine in the virtualization platform.

In examples of the present disclosure, when the cloud management platform needs to onboard the virtual machines in a certain virtualization platform, the onboarding operation module of the cloud management platform can inquire the virtual machine information of each virtual machine existing in the virtualization platform via a public API (Application Programming Interface) interface provided by the virtualization platform.

In the above, the virtual machine information can include, but is not limited to, virtual machine name, running state, IP address, operating system type, virtual machine resource specification and host machine where the virtual machine is located and so on.

After inquiring the virtual machine information of each virtual machine in the virtualization platform, the onboarding operation module can store the inquired virtual machine information, and add information such as a user that the virtual machine belongs to and an organization where the virtual machine is located.

In the above, the user and the organization are concepts of authorization grouping on the cloud management platform. When onboarding the virtual machines with the cloud management platform, the cloud administrator needs to assign a virtual machine to a certain user of a certain organization.

Step 102. receiving a first onboarding operation instruction for a target virtual machine in the virtualization platform.

Step 103. configuring a network and a VNC of the target virtual machine, and when the configuration succeeds, storing in an already-onboarded virtual machine list in a database table the virtual machine information of the target virtual machine.

In examples of the present disclosure, the target virtual machine does not specifically refer to a certain fixed virtual machine, but can refer to any virtual machine in any virtualization platform needed to be managed by the cloud management platform in a unified manner, and it will not be repeated subsequently in the examples of the present disclosure.

In examples of the present disclosure, when the onboarding operation module receives the onboarding operation instruction (herein referred to as a first onboarding operation instruction) for the target virtual machine input by the user, the onboarding operation module can acquire virtual machine information of the target virtual machine stored by the onboarding operation module itself, and send to the OpenStack control module an onboarding request (herein referred to as a first onboarding request) carrying the virtual machine information of the target virtual machine.

In the above, besides the user that the virtual machine belongs to and the organization where the virtual machine is located, the virtual machine information of the target virtual machine carried in the first onboarding request further includes information such as virtual machine name, running state, IP address, operating system type, virtual machine resource specification (e.g. CPU (Center Process Unit) model, memory size, etc.) and host machine where the virtual machine is located.

In examples of the present disclosure, when receiving the first onboarding request for the target virtual machine sent by the onboarding operation module, the OpenStack control module can configure a network and a VNC (Virtual Network Console) of the target virtual machine, and when the configuration succeeds, store in the already-onboarded virtual machine list in the database the virtual machine information of the target virtual machine, so as to realize onboarding of the target virtual machine.

In the above, after successfully onboarding the target virtual machine, the OpenStack control module can further return an onboarding success notification message to the onboarding operation module, so as to notify the onboarding operation module that the target virtual machine has been onboarded successfully, after receiving the onboarding success notification message sent by the OpenStack control module, the onboarding operation module can be informed that the target virtual machine is onboarded successfully, furthermore, the onboarding operation module can add a field such as "already onboarded" in the virtual machine information of the target virtual machine stored by the onboarding operation module itself, wherein the field "already onboarded" is configured to indicate that the target virtual machine has been onboarded.

It is worth indicating that in examples of the present disclosure, for a virtual machine that is not yet onboarded, the virtual machine information of this virtual machine stored by the onboarding operation module can further include for example a field "not onboarded", which field "not onboarded" is used to indicate that this virtual machine is not onboarded. Alternatively, for a virtual machine that is not onboarded, the virtual machine information of this virtual machine stored by the onboarding operation module may not include a special identifier, correspondingly, for any virtual machine, when the virtual machine information of this virtual machine stored by the onboarding operation module does not include the field "already onboarded", it can be determined that this virtual machine is not onboarded.

In examples of the present disclosure, when the cloud management platform successfully onboards a certain virtual machine, a system disk (a hard disk where an operating system is located) of this virtual machine and a first network card of this virtual machine are automatically onboarded to the cloud management platform. When the virtual machine is mounted with a plurality of hard disks and/or the virtual machine includes a plurality of network cards, the virtual machine further needs to perform onboarding operation on other hard disks (herein referred to as non-system disks) besides the system disk and/or other network cards besides the first network card of the virtual machine.

In the above, the hard disks mounted by the virtual machine can exist in different forms, a hard disk mounted by a virtual machine included in a virtualization platform such as Vmware (Virtual Machine ware), exists in form of a virtual machine, and a virtually mounted hard disk included in a CAS virtual machine platform does not exist in form of a virtual machine, and for hard disks existing in different forms, a specific operation flow for onboarding the same is not completely the same.

Correspondingly, in an example of the present disclosure, after the above step of storing in the already-onboarded virtual machine list in the database table the virtual machine information of the target virtual machine, it can further include:

the onboarding operation module receiving a second onboarding operation instruction for a target hard disk of the target virtual machine, the onboarding operation module sending to the OpenStack control module a second onboarding request for the target hard disk of the target virtual machine, wherein the second onboarding request including a hard disk path of the target hard disk in the virtualization platform, the OpenStack control module storing in a hard disk list in the database table the hard disk path of the target hard disk in the virtualization platform, and establishing a correlation between a hard disk list entry corresponding to the target hard disk and an already-onboarded virtual machine list entry corresponding to the target virtual machine.

In this example, the target hard disk does not specifically refer to a certain fixed hard disk, but can refer to any non-system disk mounted by the target virtual machine, and it will not be repeated subsequently in the examples of the present disclosure.

In this example, for an already-onboarded virtual machine, the user can make a choice on a relevant functional interface provided by the onboarding operation module to onboard the target hard disk.

When receiving the onboarding operation instruction for the target hard disk input on the relevant functional interface by the user, the onboarding operation module can send to the OpenStack control module an onboarding request (herein referred to as a second onboarding request) for the target hard disk.

When the OpenStack control module receives the second onboarding request for the target hard disk sent by the onboarding operation module, and the target hard disk does not exist in form of a virtual machine, the OpenStack control module can acquire the hard disk path of the target hard disk in the virtualization platform carried in the second onboarding request, store in the hard disk list of the database the hard disk path of the target hard disk in the virtualization platform, and establish a correlation between the hard disk list entry corresponding to the target hard disk and the already-onboarded virtual machine list entry corresponding to the target virtual machine, so as to realize onboarding of the target hard disk.

In another example of the present disclosure, after the above step of storing in the already-onboarded virtual machine list in the database table the virtual machine information of the target virtual machine, it further can include:

the onboarding operation module receiving a second onboarding operation instruction for a target hard disk of the target virtual machine, the onboarding operation module sending to the OpenStack control module a second onboarding request for the target hard disk of the target virtual machine, wherein the second onboarding request including a hard disk path of the target hard disk in the virtualization platform, the OpenStack control module creating a virtual machine corresponding to the target hard disk, storing in the hard disk list in the database table the hard disk path of the target hard disk in the virtualization platform, and establishing a correlation between a hard disk list entry corresponding to the target hard disk and an already-onboarded virtual machine list entry corresponding to the target virtual machine.

In this example, when the OpenStack control module receives the second onboarding request for the target hard disk sent by the onboarding operation module, and the target hard disk exists in form of a virtual machine, the OpenStack control module can create a virtual machine (this virtual machine only has a hard disk, but no CPU or memory resource) corresponding to the target hard disk, store in the hard disk list in the database the hard disk path of the target hard disk in the virtualization platform, and establish a correlation between a hard disk list entry corresponding to this target hard disk and an already-onboarded virtual machine list entry corresponding to the target virtual machine, so as to realize onboarding of the target hard disk.

Furthermore, in an example of the present disclosure, after the above step of storing in the already-onboarded virtual machine list in the database table the virtual machine information of the target virtual machine, it further includes:

the onboarding operation module receiving a third onboarding operation instruction for a target network card of the target virtual machine, the onboarding operation module sending to the OpenStack control module a third onboarding request for the target network card of the target virtual machine, wherein the third onboarding request includes network card information of the target network card;

the OpenStack control module generating a port identifier corresponding to the target network card, and storing in a network card list in the database table this port identifier and the network card information of the target network card, and establishing a correlation between a network card list entry corresponding to the target network card and a virtual machine list entry corresponding to the target virtual machine.

In this example, the target network card does not specifically refer to a certain fixed network card, but can refer to any network card on the target virtual machine besides the first network card, and it will not be repeated subsequently in the examples of the present disclosure.

In this example, for an already-onboarded virtual machine, the user can make a choice on a relevant functional interface provided by the onboarding operation module to onboard the target network card.

When receiving the onboarding operation instruction for the target network card input on a relevant functional interface by the user, the onboarding operation module can send to the OpenStack control module an onboarding request (herein referred to as a third onboarding request) for the target network card.

When the OpenStack control module receives the third onboarding request for the target network card sent by the onboarding operation module, the OpenStack control module can generate a port identifier (port ID) (wherein this port identifier is configured to uniquely identify this target network card in the OpenStack control module) corresponding to this target network card, and store in the network card list in the database table this port identifier and network card information of the target network card included in the third onboarding request, and establish a correlation between a network card list entry corresponding to this target network card and an already-onboarded virtual machine list entry corresponding to the target virtual machine, so as to realize onboarding of the target network card.

Furthermore, in an example of the present disclosure, after the above step of storing in the already-onboarded virtual machine list in the database table the virtual machine information of the target virtual machine, it can further include:

the onboarding operation module receiving a canceling onboarding operation instruction for the target virtual machine, the onboarding operation module sending to the OpenStack control module a canceling onboarding request for the target virtual machine, the OpenStack control module deleting the virtual machine information of the target virtual machine from the already-onboarded virtual machine list in the database table.

In this example, for an already-onboarded virtual machine, the user further can make a choice on a relevant functional interface provided by the onboarding operation module to cancel onboarding of this virtual machine.

When the onboarding operation module receives the canceling onboarding operation instruction for the target virtual machine, the onboarding operation module can send to the OpenStack control module a canceling onboarding request for the target virtual machine.

When receiving the canceling onboarding request for the target virtual machine, the OpenStack control module can delete the virtual machine information of this target virtual machine stored in the already-onboarded virtual machine list in the database table.

In this example, after executing a canceling onboarding operation on the target virtual machine, the OpenStack control module further needs to unmount an already-onboarded hard disk and/or network card of the target virtual machine.

In the above, a specific implementation manner in which the OpenStack control module unmounts the hard disk and/or network card can be found in implementation of existing solutions of unmounting a hard disk and/or a network card, and the same is not repeated herein in the examples of the present disclosure.

In this example, after completing the canceling onboarding operation on the target virtual machine, the OpenStack control module can further return a canceling onboarding success notification message to the onboarding operation module, so as to notify the onboarding operation module that the onboarding of the target virtual machine has been cancelled successfully. After receiving the canceling onboarding success notification message sent by the OpenStack control module, the onboarding operation module can be informed that the onboarding of the target virtual machine is successfully cancelled, furthermore, the onboarding operation module can delete the field "already onboarded" included in the virtual machine information of the target virtual machine stored by the onboarding operation module itself.

Optionally, the onboarding operation module can further add the field "not onboarded" to the virtual machine information of the target virtual machine stored by the onboarding operation module itself.

In order to enable a person skilled in the art to better understand the technical solutions provided in the examples of the present disclosure, the technical solutions provided in the examples of the present disclosure are described below in combination with specific application scenarios.

Figure 3:
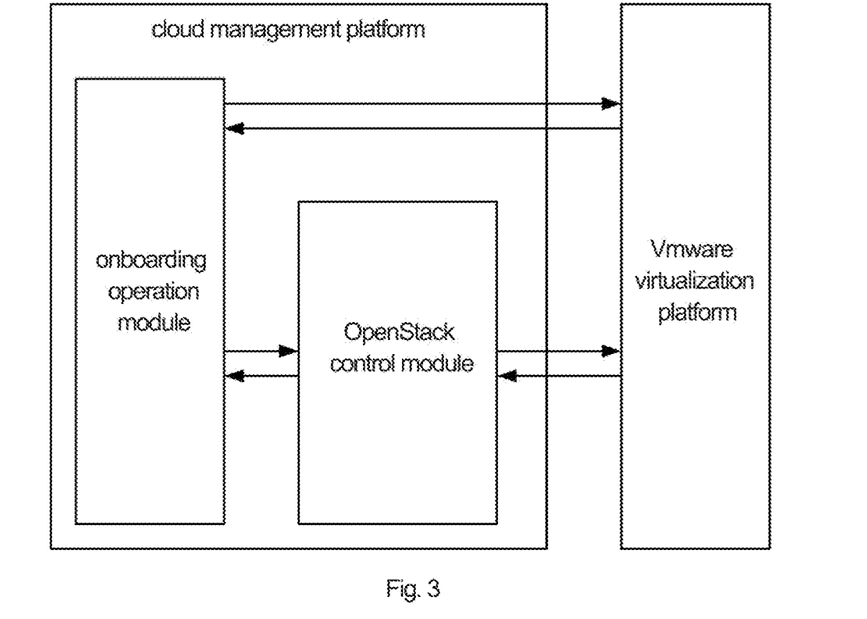
FIG. 3 is a schematic architectural diagram of a specific application scenario provided in examples of the present disclosure.

Referring to FIG. 3, it is a schematic architectural diagram of a specific application scenario provided in examples of the present disclosure, wherein this application scenario takes a virtualization platform being a VMware virtualization platform as an example.

Based on the application scenario shown in FIG. 3, an implementation flow of a virtual machine management solution provided in examples of the present disclosure is as follows:

1. The onboarding operation module uses a public API port provided by a VMware vCenter (VirtualCenter) to inquire and acquire virtual machine information of all virtual machines in a server and a cluster in a VMware resource pool corresponding to a designated computing node, wherein the virtual machine information can include virtual machine name, running state, IP address, operating system type, host machine where the virtual machine is located and so on.

2. The onboarding operation module stores the acquired virtual machine information, and adds fields such as user that the virtual machine belongs to, organization where the virtual machine is located and whether being already-onboarded or not.

3. For a virtual machine that is not onboarded (hereinafter taking a target virtual machine as an example), a user can send an onboarding operation instruction to the onboarding operation module via a relevant functional interface provided by the onboarding operation module, and after receiving the onboarding operation instruction for the target virtual machine, the onboarding operation module can detect whether in a cloud management platform there exist a resource specification combination corresponding to the target virtual machine, whether there is a mirror of an operating system corresponding to the target virtual machine and a corresponding IP network segment, wherein if all conditions are met, the onboarding operation can be executed. If it is detected that a condition is not met, prompt information can be output to prompt the user whether creating a missing condition, for example, virtual machine resource specification, IP network segment, and operating system mirror, and after all the conditions are met, the onboarding operation module can send to the OpenStack control module an onboarding request for the target virtual machine.

In the above, in this example, the onboarding request for the target virtual machine sent by the onboarding operation module to the OpenStack control module can be a creation request for the target virtual machine, which creation request carrying an onboarding flag bit.

4. When the OpenStack control module receives the creation request for the target virtual machine sent by the onboarding operation module, and finds that this creation request carries an onboarding flag bit, the OpenStack control module can block the underlying API calling for creating a virtual machine (that is, not performing a virtual machine creation operation), and directly configure information of the target virtual machine such as VNC and network, and after a successful configuration, store in an already-onboarded virtual machine list in a database table the virtual machine information of the target virtual machine, and then return an onboarding success notification message (which also can be referred to as a creation success notification message in this example) to the onboarding operation module.

5. After receiving the onboarding success notification message, the onboarding operation module can add a field "already onboarded" to the virtual machine information of the target virtual machine stored by the onboarding operation module itself, and then can execute onboarding of a corresponding hard disk and/or network card of the virtual machine that has been onboarded successfully.

6. After the target virtual machine is onboarded successfully, a system disk of the target virtual machine will be automatically onboarded. If the target virtual machine is mounted with multiple hard disks, the onboarding operation on non-system disks besides the system disk can further be performed.

In the above, when the cloud management platform onboards the hard disks mounted by the virtual machine, it is firstly needed that the virtual machine should be onboarded successfully, and a corresponding hard disk resource rule exists, then the onboarding can be performed with success.

When the onboarding operation module receives the onboarding operation instruction for the target hard disk (non-system disk) input by the user, the onboarding operation module can send to the OpenStack control module an onboarding request for the target hard disk.

In the above, in this example, the onboarding request for the target hard disk sent by the onboarding operation module to the OpenStack control module can be a creation request for the target hard disk, which creation request carrying an onboarding flag bit.

7. When the OpenStack control module receives the creation request for the target hard disk sent by the onboarding operation module, and finds that this creation request includes an onboarding flag bit, the OpenStack control module can create according to a hard disk path of the target hard disk in the VMware virtualization platform a virtual machine only having a hard disk but no CPU or memory resource, store in a hard disk list in the database table the hard disk path of the target hard disk in the VMware virtualization platform, and establish a correlation between a hard disk list entry corresponding to this target hard disk and an already-onboarded virtual machine list entry corresponding to the target virtual machine.

8. After the target virtual machine is successfully onboarded, a first network card of the target virtual machine will be automatically onboarded. If the target virtual machine includes a plurality of network cards, the onboarding operation on other network cards besides the first network card can further be performed.

In the above, in order to ensure the connectivity of the network, an IP address of the network cards of the virtual machine must be within a network range assigned to the organization where the virtual machine is located, then the network card can be onboarded successfully.

When the onboarding operation module receives the onboarding operation instruction for the target network card (other network cards besides the first network card) input by the user, the onboarding operation module can send to the OpenStack control module an onboarding request for the target network card.

In the above, in this example, the onboarding request for the target network card sent by the onboarding operation module to the OpenStack control module can be a creation request for the target network card, which creation request carrying an onboarding flag bit.

9. When the OpenStack control module receives the creation request for the target network card sent by the onboarding operation module, and finds that this creation request includes an onboarding flag bit, the OpenStack control module can block the underlying API calling for creating a network card (that is, not performing a network card creation operation), generate a port ID corresponding to the target network card, store in a network card list in the database table this port ID and network card information (e.g. IP address, network where the target network card is located, associated host information) of the target network card, and establish a correlation between a network card list entry corresponding to this target network card and an already-onboarded virtual machine list entry corresponding to the target virtual machine, so as to realize onboarding of the target network card.

10. For a virtual machine that is onboarded successfully (still taking a target virtual machine as an example), the user can perform a canceling onboarding operation via a relevant functional interface provided by the onboarding operation module. When the onboarding operation module receives a canceling onboarding operation instruction for a target virtual machine input by the user, the onboarding operation module can send to the OpenStack control module a canceling onboarding request for the target virtual machine.

In the above, in this example, the canceling onboarding request for the target virtual machine sent by the onboarding operation module to the OpenStack control module can be a deletion request for the target virtual machine, which deletion request carrying a canceling onboarding flag bit.

11. When the OpenStack control module receives the deletion request for the target virtual machine sent by the onboarding operation module, and finds that this deletion request carries a canceling onboarding flag bit, the OpenStack control module can block the underlying API calling for deleting a virtual machine (that is, not performing a virtual machine deletion operation), and delete the virtual machine information of the target virtual machine stored in the already-onboarded virtual machine list in the database table, and then return a canceling onboarding success notification message (which also can be referred to as a deletion success notification message in this example) to the onboarding operation module.

In the above, when the already-onboarded virtual machine has onboarded a non-system disk and/or network cards besides the first network card, when the onboarding of this virtual machine is canceled, it is further needed to unmount the non-system disk and/or network cards besides the first network card of this virtual machine that are onboarded previously.

It can be seen from the above description that in technical solutions provided in examples of the present disclosure, by acquiring the virtual machine information of each virtual machine in the virtualization platform, when the first onboarding operation instruction for the target virtual machine in the virtualization platform is received, the network and the VNC of the target virtual machine are configured, and when the configuration succeeds, the virtual machine information of the target virtual machine is stored in the already-onboarded virtual machine list in the database table. By acquiring the virtual machine information of each virtual machine in the virtualization platform, the onboarding of the target virtual machine is realized, thereby realizing unified management and control of the virtual machines in the virtualization platform by the cloud management platform.

Figure 4:
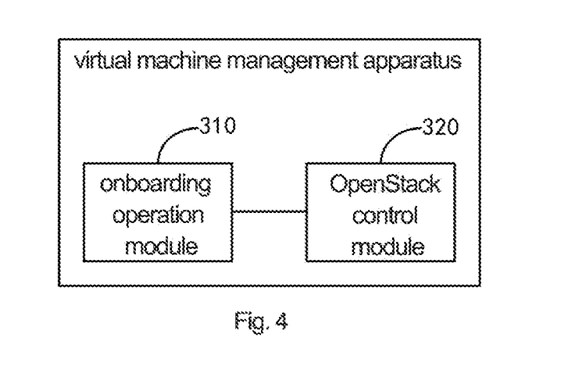
FIG. 4 is a structural schematic diagram of a virtual machine management apparatus provided in examples of the present disclosure.

Referring to FIG. 4, it is a structural schematic diagram of a virtual machine management apparatus provided in examples of the present application, wherein the virtual machine management apparatus can be applied to the cloud management platform in the above method example. As shown in FIG. 4, the virtual machine management apparatus can include an onboarding operation module 310 and an OpenStack control module 320, wherein the onboarding operation module 310 is configured to acquire virtual machine information of each virtual machine in the virtualization platform, the onboarding operation module 310 is further configured to receive a first onboarding operation instruction for a target virtual machine in the virtualization platform, the OpenStack control module 320 is configured to configure a network and a VNC of the target virtual machine according to the first onboarding request for the target virtual machine sent by the onboarding operation module, and when the configuration succeeds, store the virtual machine information of the target virtual machine carried by the first onboarding request in an already-onboarded virtual machine list in a database table.

In an optional example, the onboarding operation module 310 is further configured to receive a second onboarding operation instruction for a target hard disk of the target virtual machine, the OpenStack control module 320 is further configured to, according to a second onboarding request for a target hard disk of the target virtual machine sent by the onboarding operation module, store in a hard disk list in the database table a hard disk path of the target hard disk in the virtualization platform carried by the second onboarding request, and establish a correlation between a hard disk list entry corresponding to the target hard disk and an already-onboarded virtual machine list entry corresponding to the target virtual machine.

In an optional example, the onboarding operation module 310 is further configured to receive a second onboarding operation instruction for the target hard disk of the target virtual machine, the OpenStack control module 320 is further configured to, according to a second onboarding request for a target hard disk of the target virtual machine sent by the onboarding operation module, create a virtual machine corresponding to the target hard disk, store in a hard disk list in the database table a hard disk path of the target hard disk in the virtualization platform carried by the second onboarding request, and establish a correlation between a hard disk list entry corresponding to the target hard disk and an already-onboarded virtual machine list entry corresponding to the target virtual machine.

In an optional example, the onboarding operation module 310 is further configured to receive a third onboarding operation instruction for a target network card of the target virtual machine, the OpenStack control module 320 is further configured to, according to a third onboarding request for the target network card of the target virtual machine sent by the onboarding operation module, generate a port identifier corresponding to the target network card, store, in a network card list in the database table, the port identifier and network card information of the target network card carried by the third onboarding request, and establish a correlation between a network card list entry corresponding to the target network card and a virtual machine list entry corresponding to the target virtual machine.

In an optional example, the onboarding operation module 310 is further configured to receive a canceling onboarding operation instruction for the target virtual machine, the OpenStack control module 320 is further configured to, according to the canceling onboarding request for the target virtual machine sent by the onboarding operation module, delete the virtual machine information of the target virtual machine from the already-onboarded virtual machine list in the database table.

For implementation processes of functions and effects of various units in the above apparatus, implementation processes of corresponding steps in the above method can be specifically referred to, and unnecessary details will not be given herein.

For the apparatus example, since it is substantially corresponding to the method example, reference can be made to the description in parts of the method example for related parts. The apparatus example described above is merely illustrative, and units described as separate parts can be or also may not be physically separated, parts displayed as units can be or also may not be physical units, i.e., they can be located at one place, or also can be distributed on a plurality of network units. The objects of the solutions of the present application can be realized by selecting part or all of the modules thereof as actually required. A person ordinarily skilled in the art can understand and implement the present disclosure without using inventive efforts.

It can be seen from the above examples, by acquiring the virtual machine information of each virtual machine in the virtualization platform, when the first onboarding operation instruction for the target virtual machine in the virtualization platform is received, the network and the VNC of the target virtual machine are configured, and when the configuration succeeds, the virtual machine information of the target virtual machine is stored in the already-onboarded virtual machine list in the database table. By acquiring the virtual machine information of each virtual machine in the virtualization platform, the onboarding of the target virtual machine is realized, and further realizing a unified management and control of the virtual machines in the virtualization platform by the cloud management platform.

Besides, the various functional modules in various examples of the present application can be integrated together to form one independent portion, and it is also possible that the various modules exist independently, or that two or more modules are integrated to form one independent part.

When the function is realized in form of a software functional module and is sold or used as an individual product, it can be stored in one machine readable storage medium. For example, machine-executable instructions are stored in this machine readable storage medium, and the machine-executable instructions, when being called or executed by one or more processors, realize the virtual machine management method provided in the examples of the present disclosure.

Based on such understanding, the technical solutions in essence or parts making contribution to the prior art or parts of the technical solutions of the present application can be embodied in form of a software product, and this computer software product is stored in a storage medium, including several instructions for making one computer device (which can be a personal computer, a server or a network device etc.) execute all or part of the steps of the methods of various examples of the present application. The aforementioned storage medium includes various media that can store program codes, such as USB flash disk, mobile hard disk, Read-Only Memory (ROM), Random Access Memory (RAM), diskette or compact disk. For example, when the cloud management platform is implemented by one entity electronic device, this machine readable storage medium can be a memory of this electronic device, and when the cloud management platform is implemented by a virtual device or functional module, this machine readable storage medium can be a memory of a host machine where this virtual device or functional module is located.

Upon considering and practicing the invention disclosed herein, a person skilled in the art can easily come up with other solutions of the present disclosure. The present application is intended to cover any alterations, uses or adaptive changes of the present disclosure, and these alterations, uses or adaptive changes comply with the general principle of the present disclosure and include common knowledge or conventional technical means in the art that are not disclosed in the present disclosure. The description and the examples are merely considered as exemplary, while the real scope and spirit of the present disclosure are indicated by the following claims.

It should be understood that the present disclosure is not limited to precise structures already mentioned in the above and shown in the figures, but can be modified and changed in various ways without departing from the scope thereof. The scope of the present disclosure is merely limited by the attached claims.

The invention claimed is:

1. A virtual machine management method, wherein being applicable to a cloud management platform, the method comprising:
   acquiring virtual machine information of each virtual machine in a virtualization platform;
   receiving a first onboarding operation instruction for a target virtual machine in the virtualization platform;
   configuring a network and a virtual network console (VNC) of the target virtual machine, and when configuration succeeds, storing, in an already-onboarded virtual machine list in a database table, virtual machine information of the target virtual machine;
   receiving a second onboarding operation instruction for a target hard disk of the target virtual machine, wherein the target hard disk is any non-system disk mounted by the target virtual machine; and
   storing, in a hard disk list in the database table, the hard disk path of the target hard disk in the virtualization platform, and establishing a correlation between a hard disk list entry corresponding to the target hard disk and an already-onboarded virtual machine list entry corresponding to the target virtual machine.

2. The method according to claim 1, wherein the step of receiving the first onboarding operation instruction for the target virtual machine in the virtualization platform comprises:
an onboarding operation module of the cloud management platform receiving the first onboarding operation instruction for the target virtual machine in the virtualization platform; and
the step of configuring the network and the virtual network console (VNC) of the target virtual machine, and when configuration succeeds, storing, in the already-onboarded virtual machine list in the database table, virtual machine information of the target virtual machine comprises:
the onboarding operation module sending to an open protocol stack (OpenStack) control module of the cloud management platform a first onboarding request for the target virtual machine, wherein the first onboarding request carries the virtual machine information of the target virtual machine; and
the OpenStack control module configuring the network and the VNC of the target virtual machine, and when configuration succeeds, storing, in the already-onboarded virtual machine list in the database table, the virtual machine information of the target virtual machine.

3. The method according to claim 2, wherein the step of receiving the second onboarding operation instruction for the target hard disk of the target virtual machine comprises:
the onboarding operation module receiving the second onboarding operation instruction for the target hard disk of the target virtual machine; and
the step of storing, in the hard disk list in the database table, the hard disk path of the target hard disk in the virtualization platform, and establishing the correlation between the hard disk list entry corresponding to the target hard disk and the already-onboarded virtual machine list entry corresponding to the target virtual machine comprises:
the onboarding operation module sending to the OpenStack control module a second onboarding request for the target hard disk of the target virtual machine, wherein the second onboarding request comprises the hard disk path of the target hard disk in the virtualization platform; and
the OpenStack control module storing, in the hard disk list in the database table, the hard disk path of the target hard disk in the virtualization platform, and establishing the correlation between the hard disk list entry corresponding to the target hard disk and the already-onboarded virtual machine list entry corresponding to the target virtual machine.

4. The method according to claim 2, wherein the step of receiving the second onboarding operation instruction for the target hard disk of the target virtual machine comprises:
the onboarding operation module receiving the second onboarding operation instruction for the target hard disk of the target virtual machine; and
the step of storing, in the hard disk list in the database table, the hard disk path of the target hard disk in the virtualization platform, and establishing the correlation between a hard disk list entry corresponding to the target hard disk and the already-onboarded virtual machine list entry corresponding to the target virtual machine comprises:
the onboarding operation module sending to the OpenStack control module the second onboarding request for the target hard disk of the target virtual machine, wherein the second onboarding request comprises the hard disk path of the target hard disk in the virtualization platform; and
the OpenStack control module creating a virtual machine corresponding to the target hard disk, storing, in the hard disk list in the database table, the hard disk path of the target hard disk in the virtualization platform, and establishing the correlation between the hard disk list entry corresponding to the target hard disk and the already-onboarded virtual machine list entry corresponding to the target virtual machine.

5. The method according to claim 2, wherein after the step of storing, in the already-onboarded virtual machine list in the database table, the virtual machine information of the target virtual machine, the method further comprises:
the onboarding operation module receiving a third onboarding operation instruction for a target network card of the target virtual machine;
the onboarding operation module sending to the OpenStack control module a third onboarding request for the target network card of the target virtual machine, wherein the third onboarding request comprises network card information of the target network card; and
the OpenStack control module generating a port identifier corresponding to the target network card, storing, in a network card list in the database table, the port identifier and the network card information of the target network card, and establishing a correlation between a network card list entry corresponding to the target network card and a virtual machine list entry corresponding to the target virtual machine.

6. The method according to claim 2, wherein after the step of storing, in the already-onboarded virtual machine list in the database table, the virtual machine information of the target virtual machine, the method further comprises:
the onboarding operation module receiving a canceling onboarding operation instruction for the target virtual machine;
the onboarding operation module sending to the OpenStack control module a canceling onboarding request for the target virtual machine; and
the OpenStack control module deleting the virtual machine information of the target virtual machine from the already-onboarded virtual machine list in the database table.

7. A non-transitory machine readable storage medium, wherein machine-executable instructions are stored in the machine readable storage medium, and the machine-executable instructions, when being called or executed by one or more processors, realize the method of claim 1.

8. A virtual machine management apparatus, applicable to a cloud management platform, wherein the apparatus comprises an onboarding operation module and an OpenStack control module,
wherein the onboarding operation module is configured to acquire virtual machine information of each virtual machine in a virtualization platform;
the onboarding operation module is further configured to receive a first onboarding operation instruction for a target virtual machine in the virtualization platform;
the OpenStack control module is configured to configure a network and a VNC of the target virtual machine, and when configuration succeeds, store, in an already-onboarded virtual machine list in a database table, the virtual machine information of the target virtual machine;

the onboarding operation module is further configured to receive a second onboarding operation instruction for a target hard disk of the target virtual machine, wherein the target hard disk is any non-system disk mounted by the target virtual machine; and the OpenStack control module is further configured to store, in a hard disk list in the database table, the hard disk path of the target hard disk in the virtualization platform, and establish a correlation between a hard disk list entry corresponding to the target hard disk and an already-onboarded virtual machine list entry corresponding to the target virtual machine.

9. The apparatus according to claim 8, wherein
the onboarding operation module is further configured to send to the OpenStack control module a second onboarding request for the target hard disk of the target virtual machine, wherein the second onboarding request comprises the hard disk path of the target hard disk in the virtualization platform.

10. The apparatus according to claim 8, wherein
the onboarding operation module is further configured to send to the OpenStack control module the second onboarding request for the target hard disk of the target virtual machine, wherein the second onboarding request comprises the hard disk path of the target hard disk in the virtualization platform; and the OpenStack control module is further configured to create a virtual machine corresponding to the target hard disk, before storing, in the hard disk list in the database table, the hard disk path of the target hard disk in the virtualization platform, and establishing the correlation between the hard disk list entry corresponding to the target hard disk and the already-onboarded virtual machine list entry corresponding to the target virtual machine.

11. The apparatus according to claim 8, wherein
the onboarding operation module is further configured to receive a third onboarding operation instruction for the target network card of the target virtual machine;

the onboarding operation module is further configured to send to the OpenStack control module a third onboarding request for the target network card of the target virtual machine, wherein the third onboarding request comprises network card information of the target network card; and the OpenStack control module is further configured to generate a port identifier corresponding to the target network card, store, in a network card list in the database table, the port identifier and the network card information of the target network card, and establish a correlation between a network card list entry corresponding to the target network card and a virtual machine list entry corresponding to the target virtual machine.

12. The apparatus according to claim 8, wherein
the onboarding operation module is further configured to receive a canceling onboarding operation instruction for the target virtual machine;

the onboarding operation module is further configured to send to the OpenStack control module a canceling onboarding request for the target virtual machine; and the OpenStack control module is further configured to delete the virtual machine information of the target virtual machine from the already-onboarded virtual machine list in the database table.

\* \* \* \* \*

UNITED STATES PATENT AND TRADEMARK OFFICE
CERTIFICATE OF CORRECTION

| | |
|---|---|
| PATENT NO. | : 11,687,354 B2 |
| APPLICATION NO. | : 16/618979 |
| DATED | : June 27, 2023 |
| INVENTOR(S) | : Wu |

It is certified that error appears in the above-identified patent and that said Letters Patent is hereby corrected as shown below:

On the Title Page (73) Assignee: please correct the assignee to be --NEW H3C CLOUD TECHNOLOGIES CO., LTD.--

Signed and Sealed this
Sixth Day of August, 2024

Katherine Kelly Vidal
*Director of the United States Patent and Trademark Office*